Jan. 15, 1952  E. J. HALLORAN  2,582,628
AUTOMOBILE STABILIZING COUNTERWEIGHT
Filed April 21, 1949  2 SHEETS—SHEET 1
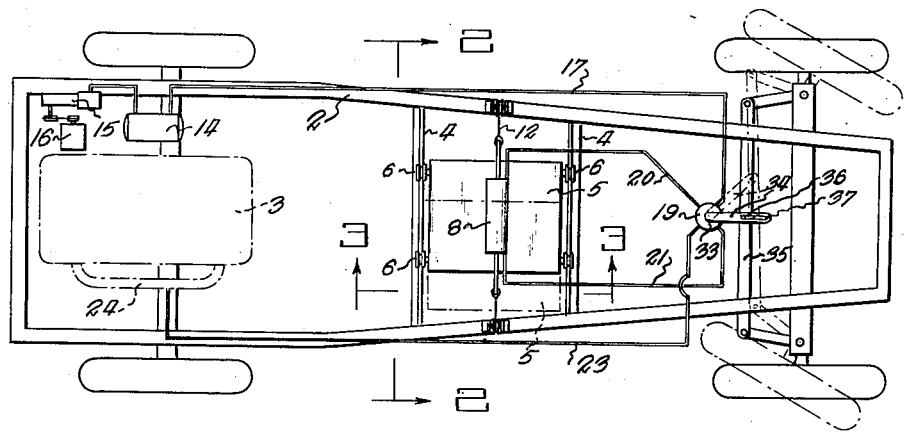
Inventor
E. J. HALLORAN
By
Attorney Jan. 15, 1952     E. J. HALLORAN     2,582,628
AUTOMOBILE STABILIZING COUNTERWEIGHT
Filed April 21, 1949     2 SHEETS—SHEET 2
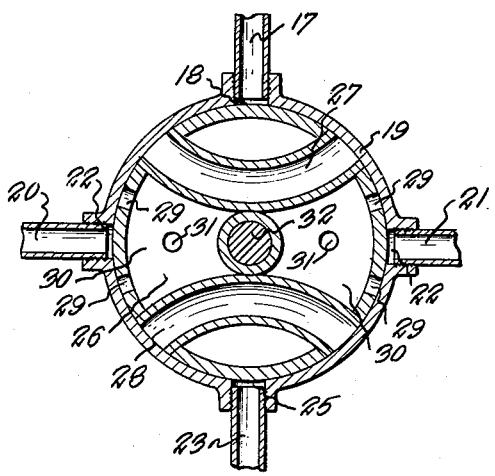
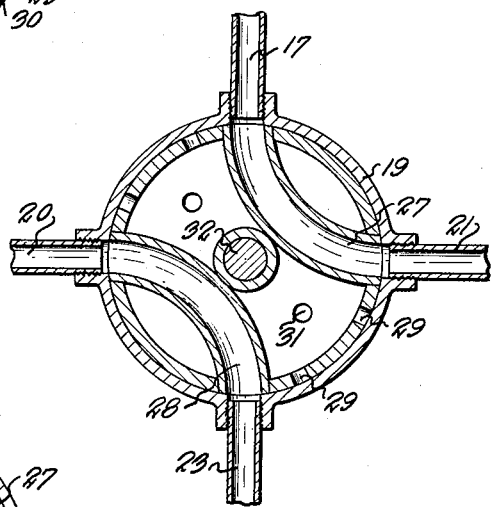
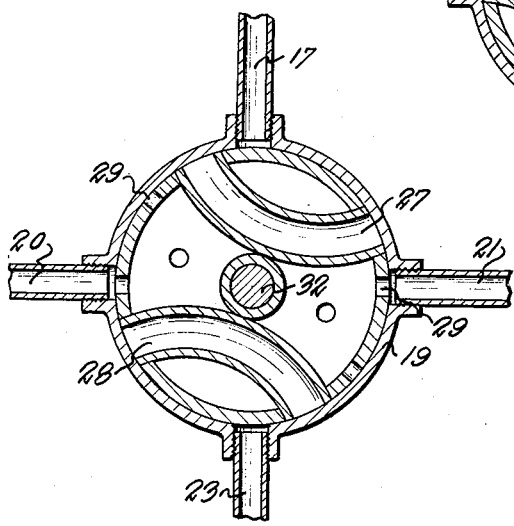
Inventor
E. J. HALLORAN
By
Attorney Patented Jan. 15, 1952

2,582,628

UNITED STATES PATENT OFFICE 2,582,628

AUTOMOBILE STABILIZING COUNTERWEIGHT

Edward J. Halloran, Hamilton, Ontario, Canada

Application April 21, 1949, Serial No. 88,730

4 Claims. (Cl. 280—112)

My invention relates to an automobile stabilizing counter-weight and the object of the invention is to provide a counter-weight which is movable transversely of the chassis to counteract the centrifugal force set up when the chassis is travelling in a curved path.

A particular object of the invention is to furnish a counter-weight which is operably controlled by the movement of the steering mechanism of the automobile whereby the counter-weight moves across the chassis in synchronization with the turning of the steering wheel.

Another object of the invention is to utilize a compressed air chamber as a source of power for moving the counter-weight through the medium of a piston and cylinder, a control valve being operably linked to the steering mechanism of the car to control the passage of air through the air lines extending from the compressed air chamber to the cylinder.

A further object of the invention is to utilize the suction of the intake manifold of the engine as an additional source of power for moving the piston and counter-weight, the application of the suction being controlled by the compressed air valve.

With the foregoing and other objects in view as shall hereinafter appear, my invention consists of an automobile stabilizing counter-weight mechanism constructed and arranged all as hereinafter more particularly described and illustrated in the accompanying drawings in which:

Fig. 1 is a plan view of an automobile chassis and engine showing my counter-weight and operating mechanism incorporated therein.

Fig. 2 is an enlarged cross-sectional view through the chassis, being taken through the line 2—2, Fig. 1.

Fig. 3 is an enlarged transverse view through the counter-weight supporting tracks, being taken through the line 3—3, Fig. 1.

Fig. 4 is an enlarged horizontal cross-sectional view through the air pressure control valve, showing such valve in the closed position.

Fig. 5 is a similar view to Fig. 4, showing the valve in the open position, wherein air passage connections are provided, and Fig. 6 is a similar view to Fig. 4, showing the valve in the position wherein it permits the air in the counter-weight actuating cylinder to be restored to atmospheric pressure.

Like characters of reference indicate corresponding parts in the different views of the drawings.

It is well known that when a vehicle is travelling in a curved path that the centrifugal force set up by the mass of the vehicle tends to force the vehicle into a path tangential to the curve, and that if the vehicle is driven around the curve at a sufficiently great speed that the centrifugal force will overcome the traction grip of the road wheels and turn the vehicle over. To overcome or counteract this tendency, the object of modern automobile design is to keep the centre of gravity of the automobile as low as possible, and with the standard design wherein the engine is in the front end of the chassis this objective has been achieved to quite an extent.

Automobile designers are now considering the advantages of placing the engine in the rear end of the chassis and also of using materials, such as plastic and light metals, which will very considerably reduce the vehicle weight. This modern type of design presents a problem in producing a car which will have the advantage of light weight construction and at the same time be stabilized in arrangement to counteract centrifugal forces set up when the car is travelling in a curved path.

By my invention I provide a stabilizing counter-weight which is capable of moving from one side of the chassis to the other to automatically set up a counterbalance when the car is passing around a curve, and in order to relieve the driver from the necessity of making any manual adjustments, I actuate the counter-weight under the control of the steering mechanism of the automobile.

In Fig. 1 of the drawings I show an automobile chassis 2 having a standard front wheel steering assembly and in which the engine 3 is mounted upon the rear end of the chassis. A pair of transverse tracks 4 are furnished to extend transversely of the chassis, being suitably secured thereto. A counter-weight 5 is rollably mounted upon the tracks so that it may move transversely of the chassis.

In the drawings, I show a counterweight and track construction wherein the tracks 4 are of concave form so that the counter-weight normally occupies a position centrally of the length of the tracks, as illustrated in Fig. 2.

The counter-weight is fitted with four runner wheels 6 which are grooved to run upon the upper edges of the tracks 4. In order to prevent the counter-weight from being jogged out of position, the counter-weight is fitted with lips 7 which extend outwardly from its lower edge to project underneath the tracks 4 and so retain the runner wheels 6 against displacement.

To move the counter-weight transversely of the chassis I furnish a cylinder 8 which is suitably secured to the automobile assembly in a position above the counter-weight, the cylinder lying parallel to the path of movement of the counter-weight. The cylindr contains a piston 9 having a pair of piston rods 10 which extend through the cylinder heads 11 and are linked to the ends of the counter-weight by cables 12 passing over suitably mounted sheave wheels 13. It will thus be appreciated that as the piston 9 moves within the cylinder, the counter-weight will also move in the opposite direction to the movement of the piston.

To actuate the piston within the cylinder, I provide a compressed air chamber 14 which is kept in a charged condition by a compressor 15 actuated by an electric motor 16 operated by the automobile electrical generating system, in the usual manner.

An air tube 17 extends from the compressed air chamber 14 to a port 18 in the control valve 19. A pair of air tubes 20 and 21 extend from the heads 11 of the cylinder 8 to ports 22 in the valve 19. An air tube 23 extends from the intake manifold 24 of the engine 3 to a port 25 in the valve 19.

The valve 19, as illustrated in Figs. 4 to 6, consists of a cylindrical shell containing a rotatable valve element 26 which has a peripheral air tight fit therein and designed to constitute the means for opening and closing the ports 18, 22 and 25. A pair of curved air ducts 27 and 28 are incorporated within the valve element 26 and are designed to form connections between the ports when the valve is in the open position, as shown in Fig. 5. The valve element also contains several air exhaust orifices 29 which are adapted to register with the ports to permit the air in the cylinder to return to atmospheric pressure when the valve is being moved into the closed position. The chambers 30 in the valve element 26 communicate with the atmosphere through orifices 31. The valve element 26 is carried upon a suitably mounted spindle 32 which projects upwardly through the valve cap 33, see Fig. 1, and to which a valve actuating lever 34 is secured. The lever 34 is designed to be swung through movement of the steering cross rod 35. A pin 36 on the cross rod projects into a slot 37 in the lever 34, which slot is of sufficient length to provide for the swinging motion as in standard practice.

Operation

When the car is travelling in a substantially straight path, as opposed to rounding a sharp curve, the counter-weight 5 remains in the central position shown in Figs. 1 and 2. The valve mechanism, as shown in Figs. 4 to 6, is so proportioned that normal movement of the cross rod 35 and lever 34 is not sufficient to move the valve element 26 from the position shown in Fig. 4 to the position shown in Fig. 5, whereby the counter-weight remains stationary.

When, however, the car is sharply turned to the right, as shown in dotted lines in Fig. 1, the valve element 26 is swung to a degree whereby the air ducts 27 and 28 are brought into register with the valve ports, as shown in Fig. 5. When the valve element is in this position communication is opened between the air tube 17 extending from the compressed air chamber 14 and the air tube 21 extending to the right-hand end of the cylinder 8, as shown in Fig. 2. At the same time the air duct 28 opens communication between the air suction tube 23 and the air tube 20 extending to the left-hand end of the cylinder 8. It will therefore be understood that the piston 9 is subjected to compressed air pressure on one side and reduced air pressure on the other side, whereby it will immediately move to the left and draw the counter-weight to the position shown in dotted lines in Fig. 2.

Upon the steering being returned to the substantially normal straight-away position, the valve element 26 will return from the position shown in Fig. 5 to the position shown in Fig. 2 and in this movement will pass through the position shown in Fig. 6 wherein two of the orifices 29 will register with the ports 22 and thus permit the compressed air to exhaust from one end of the cylinder 8 and the air in the other end of the cylinder 8 to return to atmospheric pressure, whereby the counter-weight will roll to the central neutral portion of its tracks 4 and the piston 9 return to the central portion of the cylinder 8. When the steering is turned in the opposite direction to that shown in the drawings, the valve element 26 will turn in a counter-clockwise direction whereby compressed air will be admitted to the left-hand side of the cylinder and suction applied to the right-hand side of the cylinder, referring to Fig. 2.

From the foregoing description, it will be appreciated that in normal straight-away driving wherein the movement of the steering mechanism is of a restricted nature there will be no movement of the counter-weight, but as soon as the steering mechanism is moved to cause the car to travel in a sharp curve, the counter-weight will immediately move under the opening of the steering controlled air valve and adjust the center of gravity of the car. Although I have shown and described a particular embodiment of my invention, it is to be understood that I may make such changes and alterations as I may deem necessary from time to time, without departing from the spirit of my invention as set forth in the appended claims.

What I claim as my invention is:

1. In a steerable automobile chassis, a stabilizing counter-weight movable transversely of the chassis to counteract the centrifugal force set up when the chassis is travelling in a curved path, a track extending transversely of the chassis and upon which the counter-weight rides, a cylinder, a piston normally positioned substantially centrally of the cylinder's length, means linking the piston to the counter-weight, a compressed air chamber, a two-way valve having four ports, an air tube extending from the compressed air chamber to one port, a pair of air tubes extending from the ends of the cylinder to two other ports, a source of air suction connected to the fourth port, and valve port opening and closing means which when in the open position provides air passage connections between the compressed air tube port and one of the cylinder tube ports and the suction port and the other cylinder tube port, said adjustable valve means being linked to and operable in conjunction with the steering mechanism of the chassis.

2. In a steerable automobile chassis, a stabilizing counter-weight movable transversely of the chassis to counteract the centrifugal force set up when the chassis is travelling in a curved path, a track extending transversely of the chassis and upon which the counter-weight rides, a piston and cylinder assembly, means linking the piston to the counter-weight, a compressed air chamber communicating with the cylinder, a valve controlling the passage of air from the chamber to the cylinder, valve operating means actuated by the steering mechanism of the chassis, an internal combustion engine carried upon the chassis, and wherein the cylinder on one side of the piston is subjected to air suction of the engine when the cylinder on the other side of the piston is subjected to compressed air pressure, said valve constituting a dual control for the passage of air from the chamber to the cylinder and the passage of air from the cylinder to the engine.

3. In a steerable automobile chassis having front road wheels and rear road wheels, a stabilizing counter-weight movable transversely of the chassis to counteract the centrifugal force set up when the chassis is travelling in a curved path, a track extending transversely of the chassis and positioned intermediately of the length of the portion of the chassis between the front and rear road wheels and upon which the counter-weight rides, a piston and cylinder assembly, means linking the piston to the counter-weight, a compressed air chamber communicating with the cylinder, a valve controlling the passage of air from the chamber to the cylinder, valve operating means actuated by the steering mechanism of the chassis, an internal combustion engine carried upon the chassis, and wherein the cylinder on one side of the piston is subjected to air suction of the engine when the cylinder on the other side of the piston is subjected to compressed air pressure, said valve constituting a dual control for the passage of air from the chamber to the cylinder and the passage of air from the cylinder to the engine.

4. In a steerable automobile chassis, a track extending transversely of the chassis, a counter-weight located centrally on the track and movable thereon in either direction, power actuated means on the vehicle connected to the counter-weight to move the same in opposition to centrifugal force set up when the automobile is travelling in a curved path, a source of power on the vehicle for actuating said means, and a connection between a steering mechanism for the chassis and the source of power for operation of the latter when the chassis is steered in a curved path.

EDWARD J. HALLORAN.

REFERENCES CITED

The following references are of record in the file of this patent:

UNITED STATES PATENTS

| Number | Name | Date |
| --- | --- | --- |
| 1,821,816 | Quaas | Sept. 1, 1931 |
| 1,954,409 | Hanel | Apr. 10, 1934 |
| 2,155,130 | Hanel | Apr. 18, 1939 |
| 2,261,821 | Altemus | Nov. 4, 1941 |